United States Patent [19]
Sawatzky et al.

[11] Patent Number: 5,234,494
[45] Date of Patent: Aug. 10, 1993

[54] SOFTENING AGENTS FOR RECYCLING ASPHALT PAVEMENT

[75] Inventors: Henry Sawatzky, Ottawa; Floyd I. Clelland, Renfrew; Brian A. Farnand; Jean Houde, Jr., Nepean, all of Canada

[73] Assignee: Her Majesty the Queen in Right of Canada as Represented by the Minister of Energy, Mines and Resources, Canada

[21] Appl. No.: 815,856

[22] Filed: Jan. 2, 1992

Related U.S. Application Data

[63] Continuation of Ser. No. 641,872, Jan. 16, 1991, abandoned.

[51] Int. Cl.$^5$ .............................................. C08L 95/00
[52] U.S. Cl. ............................. 106/284.4; 106/284.06
[58] Field of Search ........................ 106/284.4, 284.06

[56] References Cited

U.S. PATENT DOCUMENTS

| | | | |
|---|---|---|---|
| 3,028,249 | 4/1962 | Hoiberg | 106/284.4 |
| 4,000,000 | 12/1976 | Mendenhall | 106/280 |
| 4,177,079 | 12/1979 | Espenschield | 106/274 |
| 4,298,379 | 11/1981 | Burris | 106/284.4 |
| 4,298,397 | 11/1981 | Burris | 106/274 |
| 4,325,738 | 4/1982 | Plancher et al. | 106/284.4 |
| 4,904,305 | 2/1990 | Zanzotto et al. | 106/278 |

FOREIGN PATENT DOCUMENTS 1225062  8/1987  Canada.

*Primary Examiner*—David Brunsman
*Attorney, Agent, or Firm*—Ezra Sutton

[57] ABSTRACT

A novel asphaltic composition is provided herein. The composition consists of comminuted aged asphaltic pavement material and an effective amount, from about 2% to about 15% by weight of a blend of a soft asphalt cement, a conventional asphalt cement, or a cutback asphalt, with a nitrogen-containing, adhesion-improving, anti-stripping agent comprising a sewage sludge-derived oil, or a fraction thereof, the sewage sludge-derived oil comprising a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4%, and carbon, about 76.9% to about 79.8%.

11 Claims, 2 Drawing Sheets

SOFTENING AGENTS FOR RECYCLING ASPHALT PAVEMENT

This application is a continuation, of application Ser. No. 07/641,872, filed Jan. 16, 1991 now abandoned.

BACKGROUND OF THE INVENTION (i) Field of the Invention

This invention relates to the rejuvenation of aged asphaltic pavement.

(ii) Description of the Prior Art

As asphaltic concrete pavement ages, the asphalt cement becomes harder. This leads to the deterioration of the pavement. During this age hardening the heavy asphaltic component contents increase. A rejuvenation agent for such aged asphaltic concrete must be of sufficiently low viscosity to lower the viscosity of the aged asphalt to desired levels. It also must have a high polar to non-polar component ratio to assure compatibility with the high heavy asphaltic content in the asphalt of the salvaged aged asphaltic pavement.

Recycling of salvaged asphalt pavement has significant economic advantages because significant amounts of virgin asphalt and aggregates are needed to produce a new asphaltic cement pavement. Further, salvaged asphalt pavement contains high quality aggregates which may be either disposed of in dump sites or may be used in low performance applications. The current situation in North America concerning the hot recycle of salvaged asphalt pavement is quite extensively described in a paper by W. D. Robertson et al entitled "Mix Design—The Key to Successful Pavement Recycling" and published in the Canadian Technical Asphalt Association Proceedings of 1988, p. 330. The contents of such paper are herein incorporated by reference.

One common practice at this time is to mix old milled asphalt pavement material with soft virgin asphalt and then to heat the whole mixture by the addition of preheated virgin aggregate. The current limit in Ontario, Canada of old pavement utilization is 50%, due to environmental regulations for the amount of smoke produced when the hot aggregate is added.

Specifications for recycling agents used in hot-mix recycling are described in a paper by Kari et al in "Asphalt Paving Technology" of 1980 p. 177. The contents of such paper are herein incorporated by reference.

Cold in place recycling of asphalt pavements is increasing in popularity, as described by Wood et al in "Transportation Research Record" #1178 of 1988. The contents of such paper are herein incorporated by reference.

N. Paul Khosla described the use of emulsified recycling agents in "Asphalt Paving Technology" of 982 p. 522. The contents of such paper are herein incorporated by reference.

However, other approaches to recycling are possible. These include methods that require minimal or no heating. Several approaches are described in the following patents:

U.S. Pat. No. 4,373,961, patented Feb.15, 1983 by E. M. Stone, provided a process and composition for recycling old asphalt pavements into new pavements. It was accomplished by adding a special asphalt emulsion to the crushed old asphaltic pavement material without requiring the addition of new aggregate or heating. The old material was then cemented at the ambient temperature into a new durable composition of high stability and water resistant, softening or other appreciable change in the old asphalt, by selection of the degree of hardness and character of the asphalt base stock in the special emulsion. Thus the patentee provided a process for recycling old asphalt pavements into new pavements comprising the steps of crushing the old asphalt pavement to form an aggregate comprising asphalt and mineral matter and then emulsifying an asphalt base stock with water to form an emulsion. The aggregate was then mixed with the emulsion to form a pavement material. The pavement material was then laid and compacted as a pavement course.

Other procedures in the prior art attempted to solve the problem by improving the asphalt compositions. Thus, U.S. Pat. No. 2,904,494, patented Sep. 15, 1959 by R. L. Griffin, provided an improvement in the process of preparing asphalts having improved aging stability. The patented steps included distilling a petroleum residue to provide a reduced residue having improved stability. That residue was then blended with an asphaltic oil.

Other patents have attempted to solve the problem by adding various agents to asphalt paving compositions. Thus, U.S. Pat. No. 3,793,189, patented Feb. 19, 1974 by L. W. Corbett, provided asphaltic compositions suitable for use in paving formulations and having desirable viscosity, temperature susceptibility and ductility properties by combining propane-precipitated asphalt, asphaltenes and a liquid petroleum derivative, e.g., a heavy distillate or residual oil.

Other patents were directed to reconditioning bituminous pavements. Thus, U.S. Pat. No. 3,221,615, patented Dec. 7, 1965 by E. W. McGovern, provided for the revitalization of bituminous pavements which were in the process of becoming or which have become dry and brittle through aging and weathering by applying thereto a composition which was derived from coal tar and comprised a mixture of di-, tri- and tetracyclic aromatic compounds and their alkyl homologs containing lower alkyl groups together with a significant amount of phenolic and hydroxy derivatives.

U.S. Pat. No. 4,278,469, patented Jul. 14, 1981, by T. Y. Yan et al, provided a ductile asphaltic composition adapted for repairing and surfacing distressed asphalt pavements which comprised a blend of an asphalt component selected from marginal asphalt materials, a highly aromatic petroleum refinery residuum solvent component, and a polymeric component which is substantially asphalt-soluble.

U.S. Pat. No. 4,279,660, patented Jul. 21, 1981, by I. Kamo et al, provided a process for the recovery and reutilization of materials in existing asphalt pavements, comprising comminuting existing asphalt pavement, subjecting the comminuted pieces to the action of a solvent in a dissolving zone to separate asphalt from other component materials, recovering solvent and asphalt dissolved therein from the zone separately from the other materials, drying and classifying the other material according to size, separating asphalt from the solvent, and transferring separated asphalt and the size-classified other materials to storage zones for subsequent reuse in the preparation of asphalt pavement.

U.S. Pat. No. 4,325,738, patented Apr. 20, 1982, by H. Plancher, provided a technique for substantially improving the useful life of asphalts by adding a minor amount of a moisture-damage-inhibiting agent selected from compounds having a pyridine moiety, including acid salts of such compounds. A shale oil fraction was said to serve as the source of the improving agent and may simply be blended with conventional petroleum asphalts.

U.S. Pat. No. 4,549,834, patented Oct. 29, 1985, by J. P. Allen, provided an asphaltic composition especially suitable for rejuvenating recycled asphalt-aggregate road compositions, consisting essentially of asphaltic oils, asphaltic resins, and asphaltic pitch.

SUMMARY OF THE INVENTION

(i) Aims of the Invention

In spite of these many proposals of the prior art, there remains a need for the reconstitution of the used materials of existing asphalt pavements to provide almost new materials to be used in the construction of new asphalt pavements.

A principal object of this invention is the utilization of sewage sludge-derived oils for the rejuvenation of asphalt in salvaged asphalt paving materials and to allow recycling.

(ii) Statements of Invention

This invention still further provides an asphaltic composition consisting essentially of: comminuted aged asphaltic pavement material; an effective amount, from about 2% to about 15% by weight of a blend of an agent selected from the group consisting of a soft asphalt cement, a conventional asphalt cement, and a cutback asphalt, with a nitrogen-containing, adhesion-improving anti-stripping agent comprising a sewage sludge-derived oil, or a fraction thereof, the sewage sludge-derived oil comprising a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4%, and carbon, about 76.9% to about 79.8%.

(iii) Other Features of the Invention

The amount of such sewage sludge-derived oil or a fraction thereof, may broadly be from about 2 to about 15% by weight.

The asphaltic composition may also include at least one additional agent selected from the group consisting of other asphaltic materials, at least one rejuvenating agent and at least one softening agent.

In the asphaltic composition, the other agent may be a hydrocarbon product with physical characteristics selected to restore aged asphalt to the requirements of current asphalt specifications; or it may be a soft asphalt cement, a cutback asphalt, or a conventional asphalt cement; preferably it can be a soft virgin asphalt.

(iv) Generalized Description of the Invention

As noted above, the asphaltic composition may also include other asphaltic materials and/or rejuvenating agents and/or suitable softening agents. Such rejuvenating agents and/or suitable softening agents may be as described below:

a) A hydrocarbon product with physical characteristics selected to restore aged asphalt to the requirements of current asphalt specification, as described in Kari et al "Asphalt Paving Technology" 1980 p. 77.

b) Soft asphalt cements and cutback asphalts. One example of such agents is that known by the Trademark MOBILSOL-30. Examples of other suitable modifiers are provided in Khosla, "Asphalt Paving Technology" 1982 page 522.

c) Petroleum oils, soft asphaltic residues and conventional asphaltic cements, as described in Robertson et al "Mix Design-Key to Successful Pavement Recycling" page 330.

The comminuted aged asphaltic pavement generally is of a size up to 1" in diameter.

Sewage sludge-derived oils or fractions thereof are well suited to be used as asphaltic rejuvenation agents either neat or in combination with appropriate other conventional rejuvenating agents and/or softening agents for the following reasons:

1. They have low viscosities and thus they can soften the hardened asphalt by lowering viscosities and increasing penetration values.

2. They have an affinity for heavy residual components, e.g. asphaltenes. They are thereby compatible with asphalts of high asphaltene content and can also render other appropriate materials.

3. They improve resistance of rejuvenated recycled asphalt to stripping from the aggregates.

The sewage sludge-derived oil, unless topped at high temperatures, would not meet some of the specifications. However, it could be mixed with some other high boiling appropriate materials and then this mixture would then have the advantageous properties of both of these components for hot recycling.

In cold recycling, no complications are foreseen even if the +150° C. sewage sludge-derived oil is used. In such case, the sewage sludge-derived oil could be used neat or together with other materials.

Such sewage sludge-derived oil may be produced according to the teachings of Canadian Patent No. 1,225,062, issued Aug. 4, 1987, to T. R. Bridle, the entire contents of the disclosure being hereby incorporated by reference, and so no further description need be given.

The above-described sewage sludge-derived oils may desirably have the following composition:

The sewage sludge-derived oils comprise a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4%, and carbon, about 76.9% to about 79.8%.

The sewage sludge-derived oils can be dehydrated by distillation. Large portions of the nitrogenous groups appear to be amine and amides with some pyridinic and pyrrolic types. Large portions of the oxygen containing groups appear to be carboxylic and amide types.

The following standard test methods were used for determining the properties of the rejuvenated old asphaltic paving materials containing sewage sludge-derived oil or fractions thereof:

The Standard Specification for Viscosity-Graded Asphalt Cement for Use in Pavement Construction is ASTM D3381-83.

The standard Specification for Penetration-Graded Asphalt Cement for Use in Pavement Construction is ASTM D-946-82.

The Standrad Test Method for Penetration of Bituminous Materials is ASTM D5-86.

The Standard Test Method for Softening Point of Bitumen (Ring-and-Ball Apparatus) is ASTM D 36-86.

The Standard Test Method for Effect of Heat and Air in Asphaltic Materials (Thin-Film Oven Test) is ASTM D1754-87.

The Standard Test Method for Ductility of Biuminous Materials is ASTM D 113-86.

The Standard Test Method for Solubility of Asphalt Materials in Trichloroethylene is ASTM D 2042-81.

Standard Test Method for Kinematic Viscosity of Asphalts (Bitumens) is ASTM D 2170-85.

Standard Test Method for Viscosity of Asphalts by Vacuum Capillary Viscometer is ASTM D 2171-88.

The standard Test Method for Separation of Asphalt into Four Fractions is ASTM D4124-86.

The Standard Definitions of Terms Relating to Materials for Roads and Pavements is ASTM D8-88.

Method of Test For Stripping By Static Immersion is described by Ministry of Transportation of Ontario (MTO).

The materials used in the following examples were as follows:

Distillation fractions of sewage sludge-derived oils: +150° C., +250° C., +350° C., and +400° C.; Shell, Gulf, and Petro Canada 85/100 Pen grade asphalt; Petro Canada 150/200 Pen grade asphalt; and Local (Ottawa, Canada area) milled recycled asphalt cement (RAC).

The sewage sludge-derived oils used have the compositions as previously described.

BRIEF DESCRIPTION OF THE DRAWINGS

In the accompanying drawings.

DESCRIPTION OF THE DRAWINGS

Figure 1:
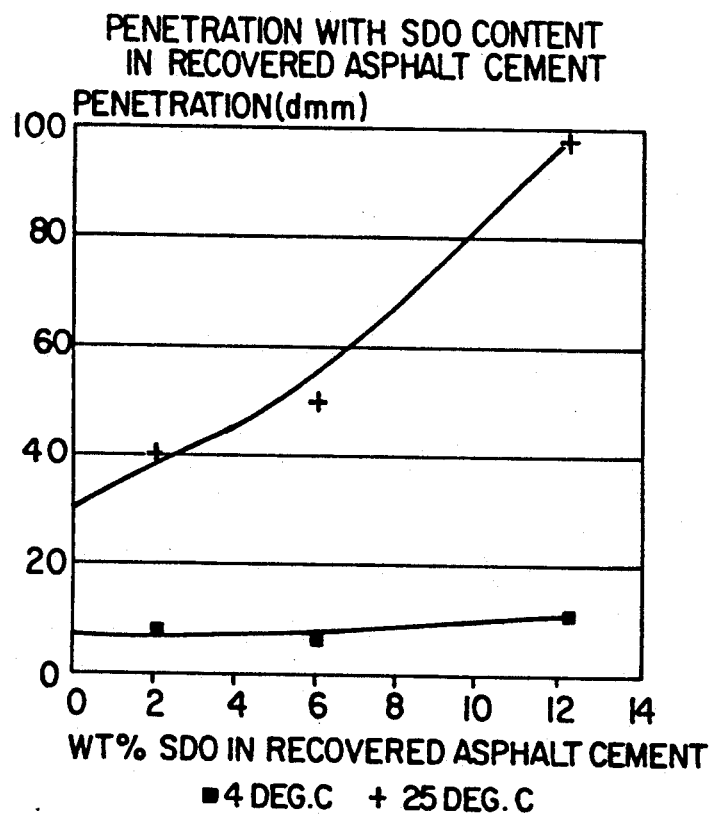
FIG. 1 is a graph showing penetration (in dmm), as ordinate and Wt % sewage sludge-derived oil in recovered asphalt cement as abscissa.

(i) Description of FIG. 1

As seen from the drawings, FIG. 1 is a graphical summary of the penetration tests previously described showing the blend of recovered asphalt cement and sewage sludge-derived oil (+150° C.), vs. penetration at 4° C. and at 25° C.

Figure 2:
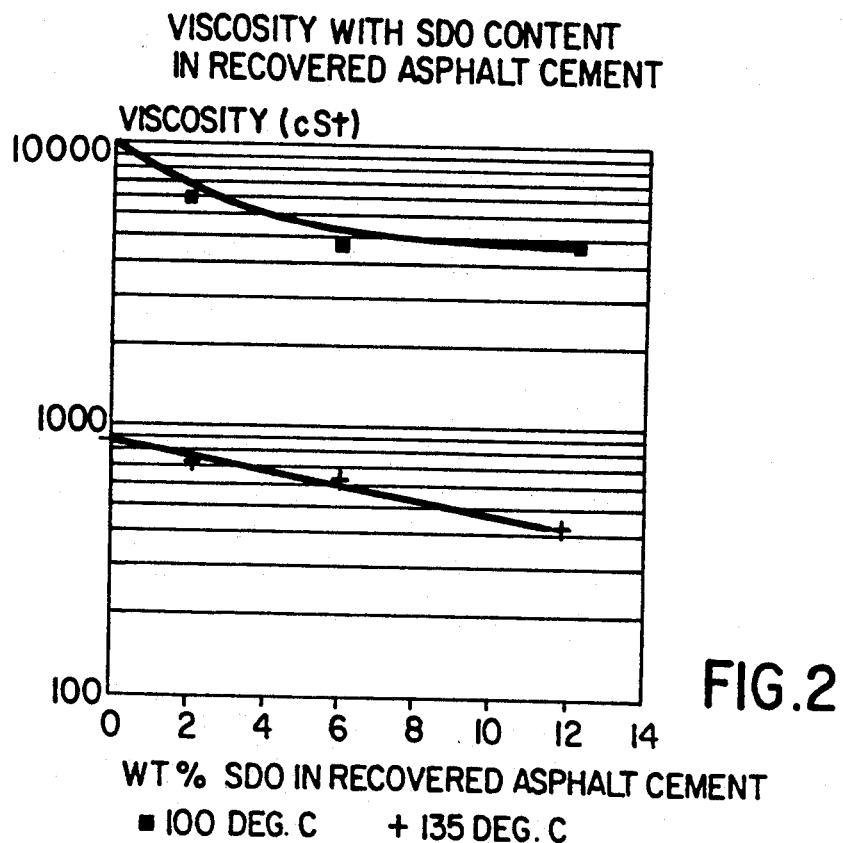
FIG. 2 is a graph of viscosity (in cSt) as ordinate and Wt % sewage sludge-derived oil in recovered asphalt cement as abscissa.

(ii) Description of FIG. 2

FIG. 2 is a graphical summary of the viscosity tests previously described showing the blend of recovered asphalt cement and sewage sludge-derived oil (+250° C.), vs. viscosity at 100° C. and at 135° C.

Figure 3:
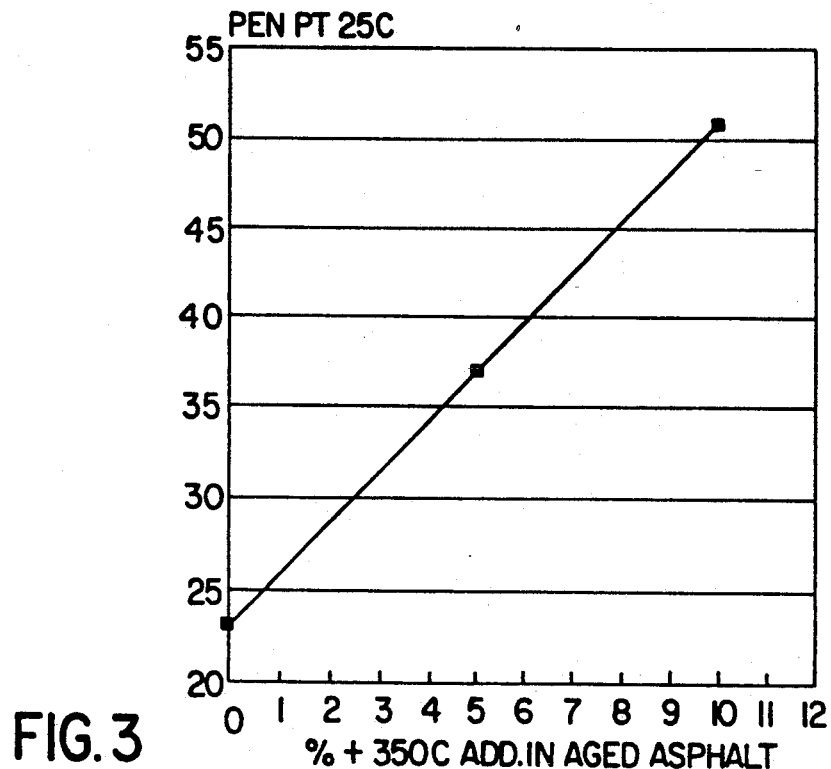
FIG. 3 is a graph of penetration (PEN in PT 25° C.) as ordinate and % sewage sludge-derived oil, +350° C. additive, in aged asphalt as abscissa.

(iii) Description of FIG. 3

FIG. 3 is a graphical summary of the penetration tests previously described showing the penetration vs. sewage sludge-derived oil, +350° C. additive, blended with aged asphalt.

Figure 4:
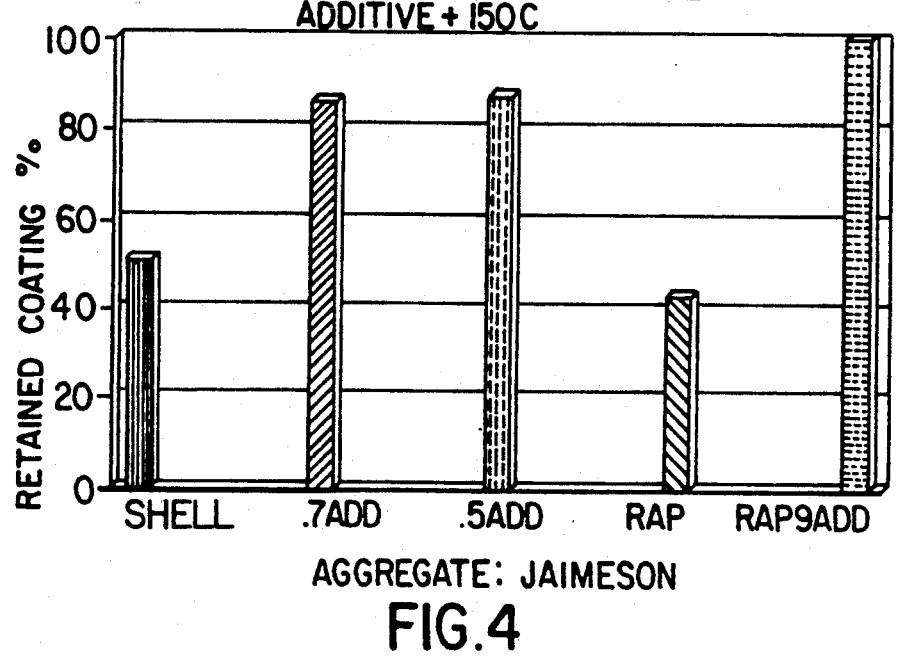
FIG. 4 is a bar graph of blends of asphalt, additive and aggregate showing the retaining coating.

(iv) Description of FIG. 4

FIG. 4 shows the amount of retained coating after the stripping by immersion test previously described.

DESCRIPTION OF EXAMPLES OF PREFERRED EMBODIMENTS

The method of incorporation of sewage sludge-derived oils into salvaged asphaltic pavement for recycle can be by various methods, including hot mixing and cold processing, with or without the presence of virgin aggregate and/or virgin asphalt cement and/or rejuvenating agents and/or other suitable softening agents. The positive results of experiments to be described hereinafter in softening salvaged asphalts, for improving compatibility, and for improving adhesion to aggregate for pavement recycling using sewage, sludge-derived oil indicate the expanded potential use and therefore market value for sewage sludge-derived oil. This is described by the following examples.

EXAMPLE 1

Aged asphalt cement extracted from discarded old pavement was softened with sewage sludge-derived oil and Bow River asphalt, (a soft virgin asphalt). As well, a hard commercial asphalt was softened with both sewage sludge-derived oil and Bow River asphalt. The penetrations and viscosities for these examples are shown in Tables 1 and 2 and graphically in FIGS. 1 and 2.

FIG. 1 is a graphical summary of the penetration tests previously described showing the blend of recovered asphalt and sewage sludge-derived oil (+150° C.) vs. penetration at 4° C. and at 25° C.

FIG. 2 is a graphical summary of the viscosity tests previously described showing the blend of recovered asphalt and sewage sludge-derived oil (+250° C.) vs. viscosity at 100° C. and at 135° C.

TABLE 1

Penetration Comparison Between Recovered Asphalt Cement and Petro Canada 85/100 Asphalt When Different Additives are Added
PENETRATION (dmm)

|  | 4° C. | 25° C. |
| --- | --- | --- |
| RAC | 7 | 30 |
| RAC + 2.1% SDO | 7 | 40 |
| RAC + 6.0% SDO | 7 | 50 |
| RAC + 12.2% SDO | 11 | 98 |
| RAC + 22.0% Bow River | 13 | 80 |
| PC 85/100 | 8 | 96 |
| PC 85/100 + 6.0% SDO | 14 | 159 |
| PC 85/100 + 14.0% Bow River | 15 | 148 |
| Bow River | >300 | n/a |
| SDO | >400 | n/a |

RAC = Recovered Asphalt Cement
SDO = Sewage Sludge-Derived Oil
PC = Petro Canada 85/100 Asphalt
The SDO fraction used was SDO +150° C.
The Bow River fraction used was Bow River +454° C.
n/a = Not analyzed

TABLE 2

Viscosity comparison Between Recovered Asphalt Cement and Petro Canada 80/100 Asphalt When Different Additives are Added
KINEMATIC VISCOSITY (cSt)

|  | 100° C. | 135° C. |
| --- | --- | --- |
| RAC | 11039 | 866 |
| RAC + 2.1% SDO | 6883 | 719 |
| RAC + 6.0% SDO | 4794 | 624 |
| RAC + 12.2% SDO | 4807 | 413 |

TABLE 2-continued

Viscosity comparison Between Recovered Asphalt Cement and Petro Canada 80/100 Asphalt When Different Additives are Added

| | KINEMATIC VISCOSITY (cSt) | |
|---|---|---|
| | 100° C. | 135° C. |
| RAC + 22.0% Bow River | 3079 | 287 |
| PC 85/100 | n/a | 332 |
| PC 85/100 + 6.0% SDO | 1690 | 218 |
| PC 85/100 + 14.0% Bow River | 1518 | 203 |
| Bow River | 67.34 | 21.44 |
| SDO | 21.95 | 7.25 |

RAC = Recovered Asphalt Cement
SDO = Sewage Sludge-Derived Oil
PC = Petro Canada 85/100 Asphalt
n/a = Not analyzed
The SDO fraction used was SDO +150° C.
The Bow River fraction used was Bow River +454° C.

A brief synopsis of the compositions (in weight %) of the virgin asphalts used, as carried out by the Asphalt Separation Test by ASTM D 4124, is as follows.

| Asphalt | Asphaltene | Saturates | Nap/Arom. | Pol/Ar. |
|---|---|---|---|---|
| PC 85/100 | 16.1 | 14.3 | 34.2 | 35.3 |
| PC 150/200 | 9.3 | 16.0 | 35.9 | 38.8 |

PC = Petro Canada Asphalts. Both asphalts are commercial asphalts graded according to penetration grades, i.e. 85/100 = penetration between 85 and 100 dmm.
Nap/Arom. = Naphthene Aromatics
Pol/Ar. = Polar Aromatics The results of the tests performed on the commercial virgin asphalts used are summarized below:

| Test | Units | PC 85/100 | PC 150/200 |
|---|---|---|---|
| Strp Imm. | % | 36 | 20 |
| Pen. 4,25,30° C. | dmm | 8,96,158 | 15,174,218 |
| Flash Pt. COC | °C. | 324 | 316 |
| Viscosity, | | | |
| 60° C. | Poises | 1573 | 476.1 |
| 135° C. | cSt | 332.1 | 191.8 |
| Ductility, 25° C. | cm | +150 | 130 |
| TriClEth.Sol'ty | % | 99.93 | 99.95 |
| TFOT Wt Loss | % | 0.024 | 0 |
| Pen. 25° C. | dmm | 53 | 99 |
| Ret.Pen. | % | 53 | 99 |
| Vis. | | | |
| 60° C. | Poises | 3178 | 799.5 |
| 135° C. | cSt | 446.2 | 244 |
| Ductility, 25° C. | cm | 150+ | n/a |
| Strp. Imm. | % | 25 | n/a |

Strp Imm. = Stripping By Static Immersion
Pen. = Penetration
TriClEth.Sol'ty = Solubility in Trichloroethylene
TFOT = Thin-Film Oven Test
Ret.Pen. = Retained Penetration
Vis. = Viscosity The results of Tables 1 and 2 indicate that small amounts of sewage sludge-derived oil soften hard asphalt and recycled asphalt as much as larger amounts of soft virgin asphalt. In particular, aged asphalt of 30 dmm penetration of 25° C. is converted to an 85/100 asphalt by the addition of 12.2% sewage sludge-derived oil; commercial 85/100 asphalt is converted to soft asphalt (150/200) by the addition of 6% sewage sludge-derived oil. As well, the recycled asphalt blended with 12.2% sewage sludge derived oil passes Ministry of Transport of Ontario specification for kinematic viscosity (minimum of 280 cSt) for 85/100 asphalt [test ASTM 2170-85]. The performance of sewage sludge-derived oil for softening hard asphalt and recycled asphalt at least matches the performance of Bow River asphalt but at significantly reduced amounts. If more Bow River had been added to the old asphalt to bring it to a specified penetration of 85/100 asphalt, then the viscosity would have been below the specified 280 cSt (minimum).

EXAMPLE 2

The addition of sewage sludge-derived oil to recycled asphalt cement has been found to improve ductility.

In this example, 5% of +150° C. sewage sludge-derived oil and 5% of +250° C. sewage sludge-derived oil were added, respectively, to aged asphalt.

A comparison of the sewage sludge-derived oil containing more lighter and less lighter material as additives for aged asphalt is shown in Table 3.

TABLE 3

INCREASE OF DUCTILITY BY ADDITION OF SDO

| | RAC V | 5% SDO* in RAC V | 5% SDO** in RAC V |
|---|---|---|---|
| Penetration @ 25° C. (mm/10) | 38 | 59 | 55 |
| Viscosity @ 60° C. (Poises) | 11425 | 2896 | 3531 |
| Ductility @ 25° C. (cm) | 31.5 | 137.0 | 101.2 |

*Sewage Sludge-Derived Oil +150° C. was used
**Sewage Sludge-Derived Oil +250° C. was used
SDO = Sewage Sludge-Derived Oil
RAC = Recovered Asphalt Cement As shown in Table 3, above, the penetrations increased from 38 to 59 and 38 to 55 and the viscosities at 60° C. were lowered from 11425 to 2896 and 3531 poises respectively. FIG. 3 is a graphical summary of the penetration tests previously described showing the penetration vs. +350° C. sewage sludge-derived oil additive blend with aged asphalt.

This shows that the material with lighter components is somewhat more effective for softening. Further, the sewage sludge-derived oil is quite effective in increasing ductilities from 31.5 to 137 and 101 cm respectively. ASTM D-946 specifies a minimum of 100 cm ductility for hard (85/100) asphalt cement. The increase in ductility demonstrates the compatibility of sewage sludge-derived oil with heavy asphaltenic materials.

EXAMPLE 3

Blends of sewage sludge-derived oil with aged asphalt when subjected to Thin-Film Oven Tests yield satisfactory results. This is shown below in Table 4 when a blend containing 9% of sewage sludge-derived oil in aged asphalt was subjected to the Thin-Film Oven Test.

TABLE 4

EFFECT OF OXIDATION
Thin-Film Oven Test

| Asphalt | PEN 25° C. (Before) | TFOT Wt Loss % | PEN 25° C. (After) | RETAINED PEN % |
|---|---|---|---|---|
| 0% SDO, COMMIII 150/200 | 174 | 0 | 99 | 56.9 |
| 10% SDO +250° C. COMMIII 150/200 | 342 | 1.06 | 187 | 54.7 |
| 0% SDO, RAC | 32 | 0.028 | | |
| 8.92% SDO +250° C. | 65 | 0.60 | 39 | 60 |

TABLE 4-continued

EFFECT OF OXIDATION
Thin-Film Oven Test

| Asphalt | PEN 25° C. (Before) | TFOT Wt Loss % | PEN 25° C. (After) | RETAINED PEN % |
|---|---|---|---|---|
| RAC | | | | |

PEN = Penetration (dmm)
COMMIII = A commercial Asphalt
SDO = Sewage Sludge-Derived Oil
RAC = Recovered Asphalt Cement
TFOT = Thin-Film Oven Test As also noted above, the retained penetration was 60% which passes the Ministry of Transport of Ontario and ASTM D-946 specifications.

EXAMPLE 4

The change in viscosities after Thin-Film Oven Tests is shown in Table 5.

TABLE 5

RECOVERED ASPHALT CEMENT BLENDS
VS. VISCOSITY AT 60° C.

| Asphalt Cement Blend | Viscosity @ 60° C. (P) |
|---|---|
| RAC + 0% SDO +250° C. | 29 720 |
| TFOT Residue | 45 210 |
| RAC + 9% SDO +250° C. | 5 330 |
| TFOT Residue | 9 583 |

RAC — Recovered Asphalt Cement
TFOT — Thin-Flim Oven Test
SDO — Sewage-Sludge Derived Oil This viscosity change is within the specifications required by those Canadian transportation agencies who set this specification.

With 85/100 and 150/200 penetration grade asphalts it has been found that at least 5% of the +150° C. sewage sludge-derived oil can be added before the blends fail the Thin-Film Oven Test due to volatization of the lighter components. With the heavier aged asphalts considerably more can be added of the +150° C. sewage sludge-derived oil; alternatively a higher initial boiling point sewage sludge-derived oil could be used. Those asphalts could be diluted with other materials, e.g. soft virgin asphalt.

EXAMPLE 5

The compatibility of sewage sludge-derived oil with heavy residual materials was then assessed. Sewage sludge-derived oil was added to CANMET hydrocracking pitch (S.P.111° C.) and to ROSE TM residue (S.P.158° C.) in equal proportions, heated until liquid and thoroughly mixed. An aged Athabascan asphaltene fraction was similarly treated with twice its weight of sewage sludge-derived oil.

A description of the characteristics of the above-referred-to CANMET hydrocracking pitch is as follows: Very heavy material. Typically 50–80% Asphaltenes.

Asphaltene content varies with the feedstock and the conversion rate selected for the process. (See U.S. Pat. No. 4,683,005 Jul. 28, 1987 M. A. Poirier).

A description of the characteristics of the above-referred-to ROSE TM residue is as follows:

Residuum Oil Supercritical Extraction (ROSE TM) process by the phenomena of reverse solubility separates asphaltenes from heavy oil residues using propane or butane solvent. The characteristics of the hydrocracking pitch will vary according to the feed stock used, but typically very high in asphaltenes: R & B softening Pt. 80°–100° C.

| Viscosities | 200–400 cSt 200° C. |
|---|---|
| Nickel & Vanadium | 100–300 wppm (high) |

In the case of the hydrocracking pitch and the ROSE TM blends, the materials appeared to dissolve completely in the sewage sludge-derived oil. In the case of the asphaltenes, there appeared to be only a very small portion of skin-like material that did not dissolve in the sewage sludge-derived oil. This small amount of insoluble material probably was due to oxidation of the asphaltene fraction on ageing.

The mixtures were very viscous, on cooling, but no phase separation could be detected, even after several weeks. Thus, it is concluded that the sewage sludge-derived oil has an affinity for heavy asphaltic materials. The fact that the addition of sewage sludge-derived oil to aged asphalt markedly increases the ductilities as was shown above in Table 3 supports this conclusion.

The sewage sludge-derived oils are fairly immiscible with hydrocarbon fraction that have high saturated hydrocarbon contents. While it is not desired to be restricted by any theory, it is believed that there is a possibility that asphalts that are high in saturated hydrocarbons, in particular waxy components, may be incompatible when very large amounts of sewage sludge-derived oil are added. However, such asphalts would not be generally desired for paving.

EXAMPLE 6

The addition of sewage sludge-derived oil to aged asphalt can markedly improve the resistance to stripping of the rejuvenated asphalt from aggregates. This is shown in the bar graph shown in FIG. 4, which shows the results of the stripping by static immersion test.

As seen in FIG. 4, 9% of sewage sludge-derived oil was added to the aged asphalt. In addition to rejuvenation, this retained surface coverage after the stripping test was 100% for this rejuvenated asphalt and was only 42% for the aged asphalt. The result for the recycled asphalt blended with sludge-derived oil exceeds the Ministry of Transport of Ontario requirement of 95% coverage for hard asphalts.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What we claim is:

1. An asphaltic composition consisting essentially of: comminuted aged asphaltic pavement material; an effective amount, from about 2% to about 15% by weight of a blend of an agent selected from the group consisting of a soft asphalt cement, a conventional asphalt cement, and a cutback asphalt, with a nitrogen-containing, adhesion-improving, anti-stripping agent comprising a sewage sludge-derived oil, or a fraction thereof, said sewage sludge-derived oil comprising a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4%, and carbon, about 76.9% to about 79.8%.

2. The asphaltic composition of claim 1 where the amount of said sewage sludge-derived oil blend is from about 2% to about 12% by weight.

3. The asphaltic composition of claim 2 and also blended with soft virgin asphalt.

4. The asphaltic composition of claim 1 blended with soft virgin asphalt.

5. The asphaltic composition of claim 1 and further including at least one additional agent selected from the group consisting of at least one rejuvenating agent and at least one softening agent.

6. The asphaltic composition of claim 1 and also including at least one additional agent selected from the group consisting of other asphaltic materials, at least one rejuvenating agent and at least one softening agent.

7. The asphaltic compositions of claim 1 wherein said sewage sludge-derived oil has the following elemental composition: nitrogen, 3.42% to 4.95% weight; oxygen, 5.84% to 6.89% by weight; sulfur, 0.34% to 0.83% by weight; hydrogen, 9.70% to 10.44%, and carbon, 76.92 to 79.76%.

8. The asphaltic composition of claim 7 where the amount of said sewage sludge-derived oil blend is from 2% to 12% by weight.

9. The asphaltic composition of claim 8 and also blended with soft virgin asphalt.

10. The asphaltic composition of claim 7 blended with soft virgin asphalt.

11. The asphaltic composition of claim 7 and also including at least one additional agent selected from the group consisting of at least one rejuvenating agent and at least one softening agent.

* * * * *